United States Patent [19]

Honda

[11] Patent Number: 5,311,323
[45] Date of Patent: May 10, 1994

[54] VIDEO SIGNAL RECORDING SYSTEM
[75] Inventor: Hideo Honda, Tokyo, Japan
[73] Assignee: Sony Corporation, Tokyo, Japan
[21] Appl. No.: 924,456
[22] Filed: Aug. 4, 1992
[30] Foreign Application Priority Data
  Aug. 21, 1991 [JP] Japan .................. 3-209018
[51] Int. Cl.[5] ............................... H04N 5/76
[52] U.S. Cl. .................... 358/335; 358/340;
                                  360/60; 348/476
[58] Field of Search ............... 358/335, 319, 340, 148,
       358/155, 330, 165, 12, 147; 360/60, 37.1, 13, 15;
                                    380/5; H04N 5/782

[56] References Cited
U.S. PATENT DOCUMENTS

| 4,488,183 | 12/1984 | Kinjo | 358/319 |
|---|---|---|---|
| 4,907,093 | 3/1990 | Ryan | 360/37.1 |
| 4,937,679 | 6/1990 | Ryan | 358/335 |
| 5,134,496 | 7/1992 | Schwab et al. | 358/335 |
| 5,153,724 | 10/1992 | Miyoshi et al. | 358/165 |
| 5,172,240 | 12/1992 | Nakazato | 358/330 |
| 5,172,241 | 12/1992 | Lee | 358/335 |

Primary Examiner—Tommy P. Chin
Assistant Examiner—Huy Nguyen
Attorney, Agent, or Firm—Lewis H. Eslinger; Jay H. Maioli

[57] ABSTRACT

A video recording system is provided with a copy guard arrangement which can readily discriminate a video signal having pseudo horizontal synchronizing pulses in a portion of a vertical blanking interval, from a normal video signal, without deteriorating the quality of recorded pictures. Preferably, an analog circuitry or a microcomputer is designed to count the horizontal synchronizing pulses received during a predetermined portion of the vertical blanking interval, and to discriminate a copy-guarded video signal from an unguarded video signal in accordance with the result of the counting. In the case of the copy-guarded video signal, an inhibit signal is produced to prevent a normal recording operation.

5 Claims, 4 Drawing Sheets

VIDEO SIGNAL RECORDING SYSTEM

BACKGROUND OF THE INVENTION

The present invention relates to a video signal recording system which records reproduced normal video signals in a normal mode but prevents the normal recording of reproduced video signals provided with copy guards.

A current copy guard technique utilizes pseudo horizontal synchronizing pulses inserted in a portion of a vertical blanking interval. The pseudo pulses are equal to or higher than the black level, and more in number than normal. These pseudo pulses cause an auto gain control (AGC) circuit of a video signal recording system to vary the brightness of pictures. This copy guard system makes use of the difference in time constant between a television reproducing system and a video recording system.

This conventional copy guard system, however, tends to deteriorate the quality of recorded pictures because this system must increase the gain of the AGC circuit to some extent in order to improve the performance of the copy guard. Furthermore, these pseudo horizontal synchronizing signals occupy a considerable portion of the vertical blanking period, so that the use of the vertical blanking period for other data is limited.

SUMMARY OF THE INVENTION

It is an object of the present invention to provide a video signal recording system which can achieve the function of copy guard without deteriorating the picture quality.

According to the present invention, a video recording system comprises a video recording means, and a copy guard means which receives horizontal synchronizing pulses and produces an inhibit signal to prevent a normal recording operation of the recording means when a number of the horizontal synchronizing pulses received during a predetermined portion of a vertical blanking interval is in a predetermined range. The copy guard means may encompass a counting means for counting the horizontal synchronizing pulses and produce a count signal representing a total number of the horizontal synchronizing pulses received during a predetermined counting interval within the vertical blanking interval, and a discriminating means for comparing the total number with a predetermined reference number.

DETAILED DESCRIPTION OF THE INVENTION

Figure 1:
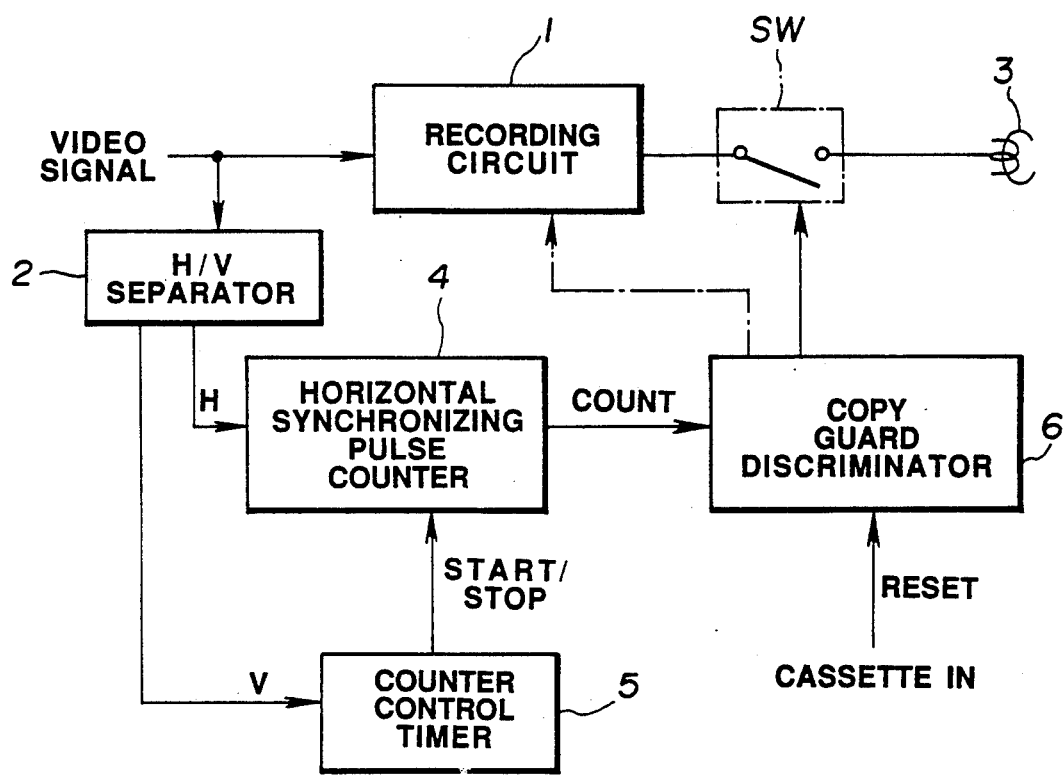
FIG. 1 is a circuit block diagram of a video signal recording system according to a first embodiment of the present invention.
Figure 2:
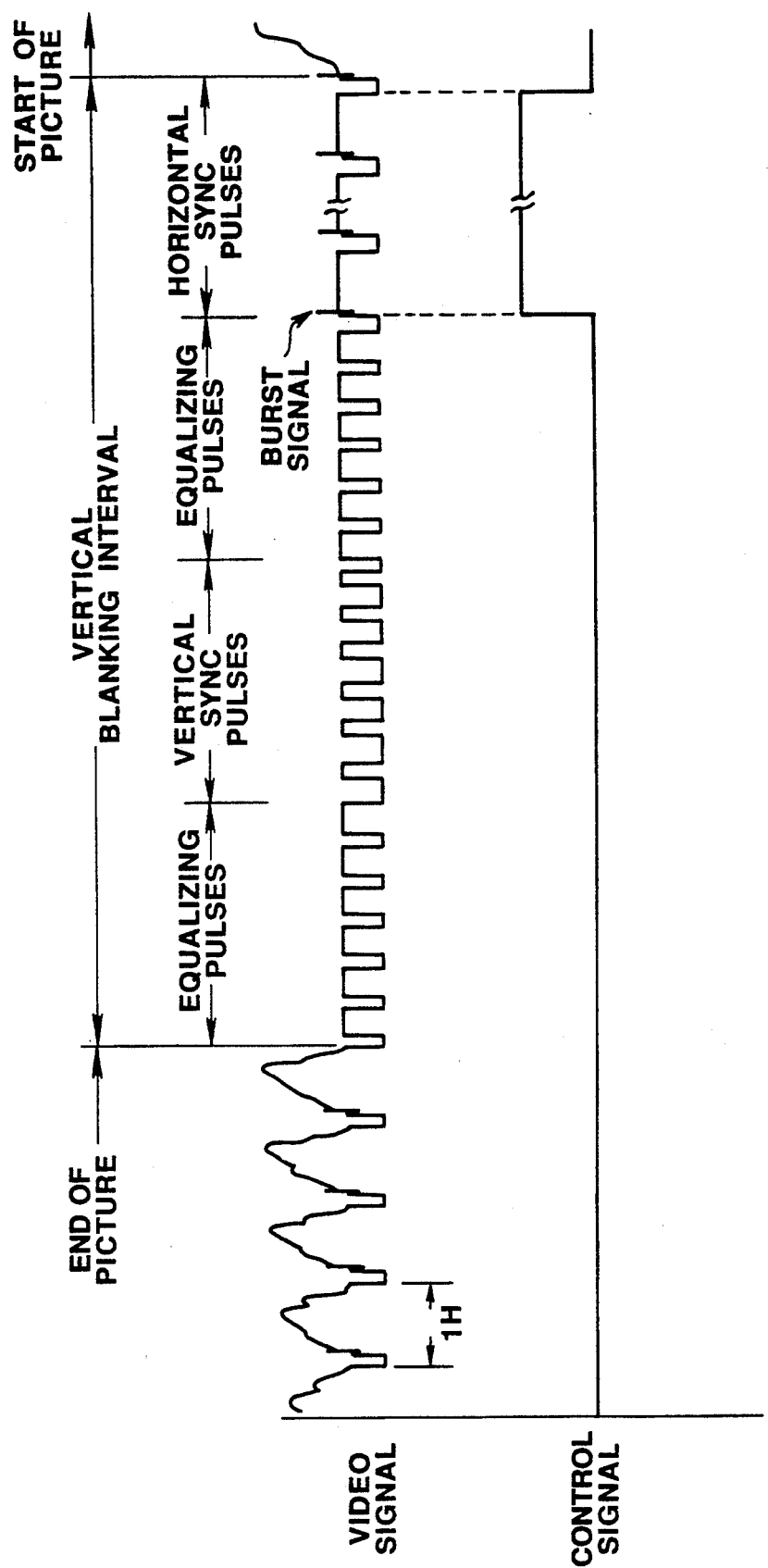
FIG. 2 is a view showing waveforms of video signal and control signal appearing in the system shown in FIG. 1.
Figure 3:
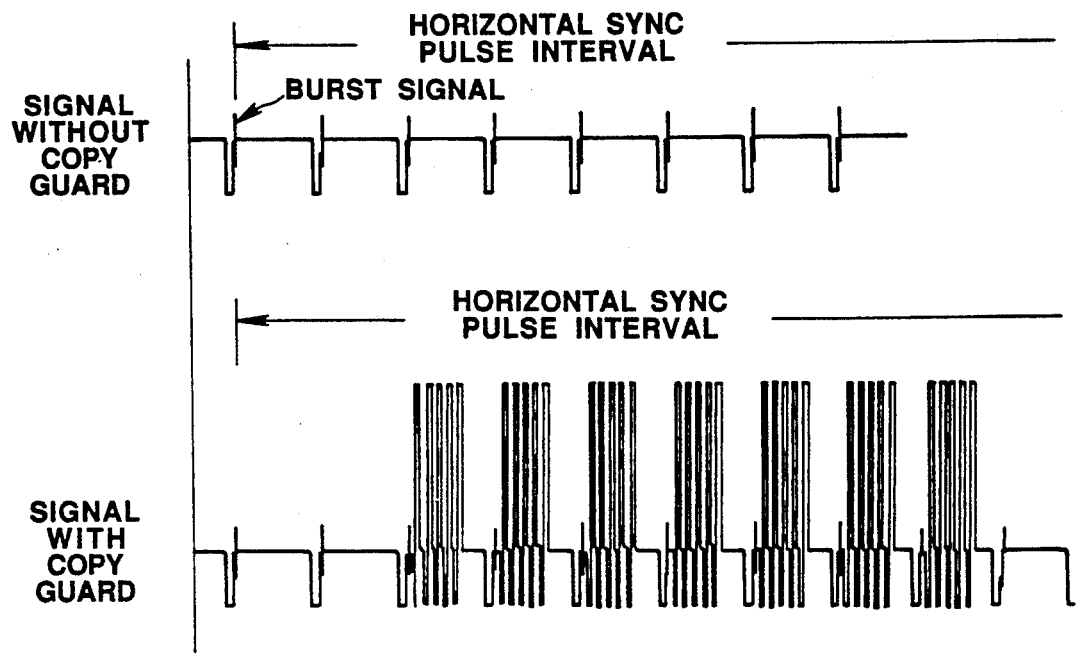
FIG. 3 is a view showing waveforms of a signal with copy guard, and a signal without copy guard.

FIGS. 1-3 show a video recording system according to a first embodiment of the present invention.

FIG. 2 shows a waveform of a video signal. As shown in FIG. 2, a vertical blanking interval consists of a first equalizing signal interval, a vertical synchronizing signal interval following the first equalizing signal interval, a second equalizing signal interval following the vertical synchronizing signal interval, and a horizontal synchronizing signal interval following the second equalizing signal interval. The vertical synchronizing signal interval is interposed between the first and second equalizing signal intervals. Copy guard signals are inserted in the horizontal synchronizing signal interval.

FIG. 3 shows waveforms of a copy-guarded signal provided with copy guard, and an unguarded signal provided with no copy guard. The guarded signal has a portion of a 7H length in which five pseudo horizontal synchronizing pulses are inserted in each 1H (horizontal line) interval. Therefore, a total number (count) of horizontal synchronizing pulses is greater by 35 (=7×5) than that of the unguarded signal.

FIG. 1 shows the video signal recording system according to the first embodiment. This recording system includes a recording circuit 1, a H/V separator circuit 2 (corresponding to a separating means), a switch SW and a video record head 3. Each of the recording circuit 1 and the H/V separator 2 has an input terminal for receiving reproduced video signals of the guarded or unguarded types. The recording circuit 1 performs a frequency conversion and other signal processing operations of the input video signal for video recording. The recording circuit 1 delivers an output signal from an output terminal, to the video record head 3 through the switch SW.

The recording system further includes a horizontal synchronizing pulse counter 4 (corresponding to a counting means) and a counter control timer 5 for controlling the horizontal synchronizing pulse counter 4. The H/V separating circuit 2 separates the horizontal synchronizing pulses from the vertical synchronizing pulses of the video signal, and delivers the horizontal synchronizing pulses to the counter 4, and the vertical synchronizing pulses to the timer 5. The horizontal synchronizing pulse counter 4 responds to the leading edge of each input pulse, and counts the number of pulses received during a predetermined time interval. This time interval of the counter 4 is controlled by the timer 5. The timer 5 produces a control signal shown in a lower half of FIG. 2 by using a leading edge of the vertical synchronizing signal as a reference, and sends the control signal to the horizontal synchronizing pulse counter 4. This control signal has a pulse corresponding to the horizontal synchronizing signal interval within the vertical blanking interval. The leading edge of this pulse causes the counter 4 to initiate an upward count from a reset state, and the counter 4 terminates the upward count at the trailing edge of the pulse.

The recording system further includes a copy guard discriminating circuit 6 which receives a count signal representing the count of the counter 4, and compares the count with predetermined upper and lower limits LIMITmax (or Lmax) and LIMITmin (or Lmin), to determine whether the count is equal to or greater than the lower limit and at the same time equal to or smaller than the upper limit. The upper and lower limits are preliminarily determined on the basis of the fact that the guarded signal has 35 surplus pulses. If the count indicated by the counter 4 is within a range between the upper and lower limits, then the discriminating circuit 6 judges that there exist a copy guard, and opens the switch SW by sending an OPEN signal to the switch SW. In this example, the range is inclusive of both of the upper and lower limits. If the count is not in this range, then the discriminating circuit 6 judges there exists no copy guard, and closes the switch SW by sending a CLOSE signal.

It is possible to increase the accuracy of judgement by utilizing a plurality of data items supplied from the horizontal synchronizing pulse counter 4. In this case, the discriminating circuit 6 checks a plurality of counts supplied successively from the counter, to determine whether LIMITmin≦COUNT≦LIMITmax or not, and produces the signal to open the switch SW when the affirmative answer is obtained N times successively. It is possible to omit the comparison with the upper limit LIMITmax. In this case, the discriminating circuit 6 compares the current entry (COUNT) of the count only with the lower limit, and determines whether LIMITmin≦COUNT, or not. However, the judgement using both of the upper and lower limits is advantageous for preventing malfunctions due to noises.

The copy guard discriminating circuit 6 further receives a cassette-in signal, and is reset by this signal.

The thus-constructed video recording system is operated as follows: When a reproduced video signal is inputted, the counter control timer 5 sends the control signal shown in FIG. 2 to the horizontal synchronizing pulse counter 4. Therefore, the counter 4 counts the horizontal synchronizing pulses received during the horizontal synchronizing signal interval within the vertical blanking interval, and delivers a count signal representing the total number of the horizontal synchronizing pulses received during that interval, to the copy guard discriminating circuit 6.

If the input video signal is guardless, the count is smaller than the lower limit (LIMITmin), and therefore, the copy guard discriminating circuit 6 closes (or holds closed) the switch SW by producing the CLOSE signal. Therefore, the guardless video signal is processed by the recording circuit 1, sent through the closed switch SW to the video record head 3, and recorded in the recording medium in the normal recording mode.

If the input video signal is provided with copy guard signals as shown in the lower half of FIG. 3, then the count is in the range between the upper and lower limits, and the discriminating circuit 6 opens the switch SW by sending the OPEN signal. In this way, this system prohibits unauthorized dubbing by opening the switch SW between the recording circuit 1 and the video head 3.

Figure 4:
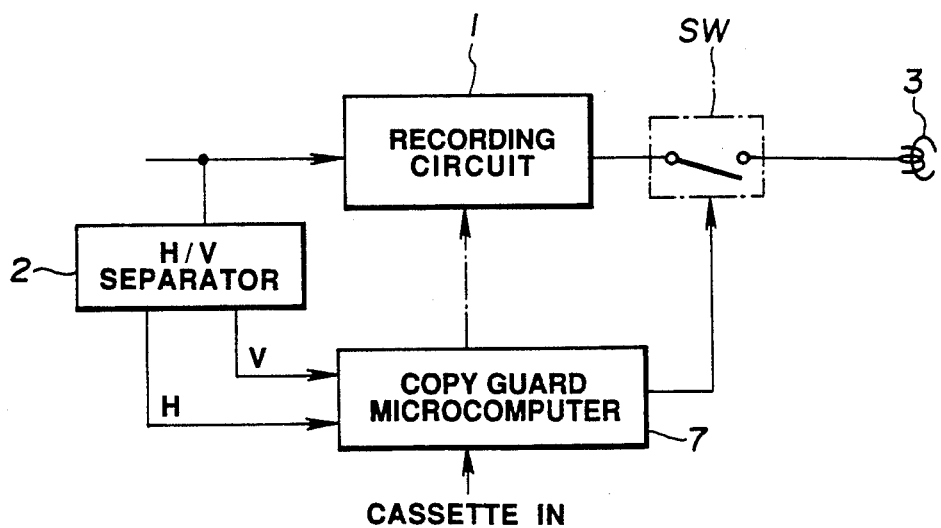
FIG. 4 is a block diagram showing a video signal recording system according to a second embodiment of the present invention.
Figure 5:
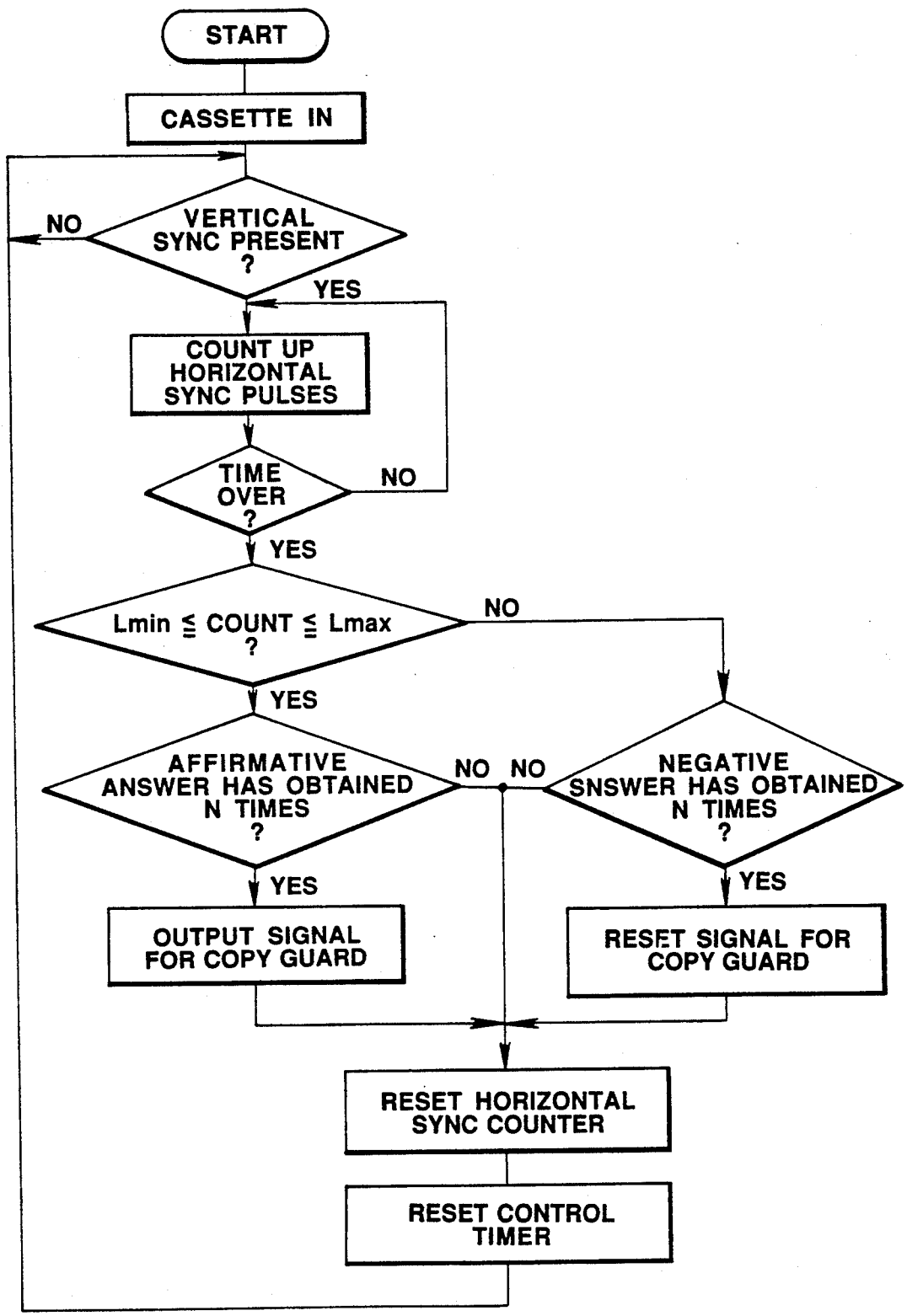
FIG. 5 is a flowchart showing a procedure performed by a microcomputer shown in FIG. 4.

FIGS. 4 and 5 show a video recording system according a second embodiment of the present invention. As shown in FIG. 4, this system employs a microcomputer 7 for copy guard, in place of the combination of the counter 4, timer 5 and discriminating circuit 6 shown in FIG. 1. The copy guard microcomputer 7 receives the horizontal and vertical synchronizing signals and the cassette-in signal, and performs a program shown in FIG. 5. The microcomputer 7 performs the functions of the counter 4, the timer 5 and the discriminating circuit 6, and opens the switch SW when the input video signal contains the pseudo pulses.

The recording systems shown in FIGS. 1 and 4 are arranged to prohibit dubbing of guarded video signals by opening the switch S. However, it is possible to arrange the systems as shown in one dot chain lines in FIGS. 1 and 4. In this case, the discriminating circuit 6 of FIG. 1 or the microcomputer 7 of FIG. 4 changes a predetermined circuit parameter (or circuit constant) of the recording circuit 1 to an abnormal value to prohibit dubbing.

The present invention is applicable to video recording systems of various types. For example, the video recording system according to the present invention may be a video recording and reproducing system comprising not only the recording circuit 1 but also a reproducing system, or may be a double deck system.

The recording systems shown in FIGS. 1 and 4 are arranged to discriminate a guarded signal from an unguarded signal by counting horizontal synchronizing pulses. However, it is possible to discriminate the signals shown in FIG. 3 by measuring the period of the horizontal synchronizing pulses (or the pulse spacing or the pulse repetition rate of the horizontal synchronizing pulses).

What is claimed is:

1. A video recording system comprising:
   video recording means including a recording circuit and a video record head for normally recording a video signal in a normal recording mode;
   separating means for separating horizontal synchronizing pulses of said video signal from vertical synchronizing pulses of said video signal;
   counting means for counting said horizontal synchronizing pulses fed from said separating means and producing a signal representing a count which is a total number of said horizontal synchronizing pulses received in a counting interval within a vertical blanking interval of said video signal;
   timer means connected to said counting means and receiving said vertical synchronizing pulses from said separating means and producing a counter control signal fed to said counting means to start and stop a counting operation of said counting means and define said counting interval;
   discriminating means for determining whether said count is within a predetermined range, and producing an inhibit signal to prevent a normal recording operation of said recording means when said count is within said predetermined range; and
   switch means interposed between said recording circuit and said video record head for disconnecting said video record head when said inhibit signal is produced by said discriminating means.

2. A recording system according to claim 1 wherein said discriminating means includes a means for comparing said count with a predetermined lower limit and produces said inhibit signal when said count is equal to or greater than said lower limit.

3. A recording system according to claim 1 wherein said discriminating means includes a means for determining whether said count is within said predetermined range which is a range between a predetermined lower limit and a predetermined upper limit, and produces said inhibit signal when said count is within said predetermined range.

4. A recording system according to claim 1 wherein said inhibit signal from said discriminating means is fed to said video recording circuit to control the recording operation thereof.

5. A recording system according to claim 1 wherein said system comprises a microcomputer which comprises said counting means and said discriminating means.

* * * * *